No. 817,021. PATENTED APR. 3, 1906.
C. A. TUCK.
BROODER.
APPLICATION FILED JUNE 26, 1905.
2 SHEETS—SHEET 1.
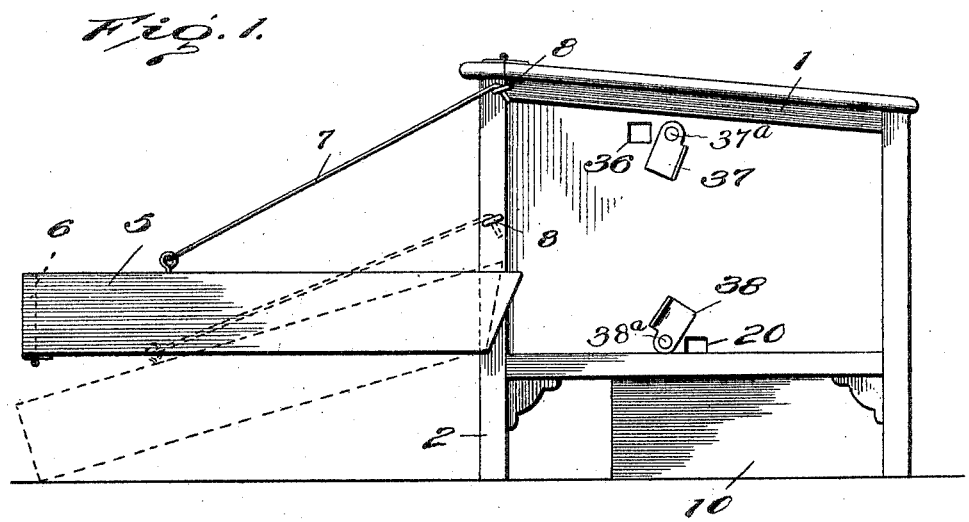
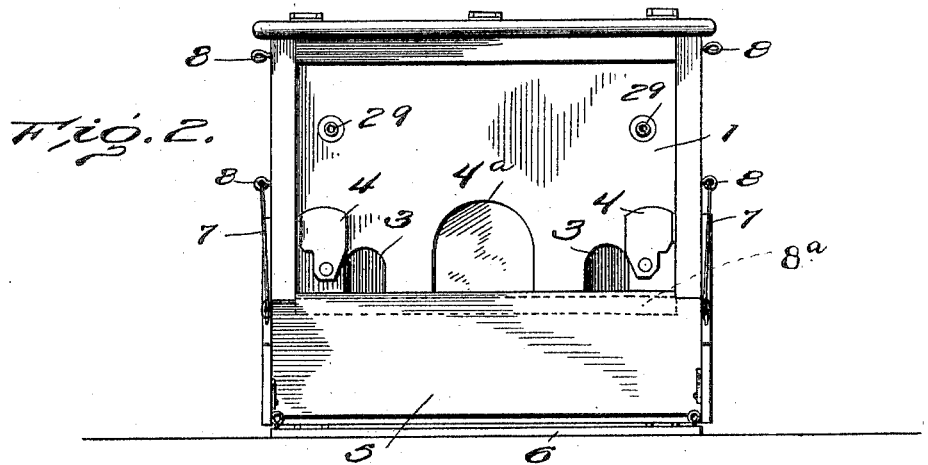
Witnesses
S. R. Thomas
F. J. Vehmeyer
Inventor
Clarence A. Tuck
By Edson Bro's
Attorneys No. 817,021. PATENTED APR. 3, 1906.
C. A. TUCK.
BROODER.
APPLICATION FILED JUNE 26, 1905.
2 SHEETS—SHEET 2.
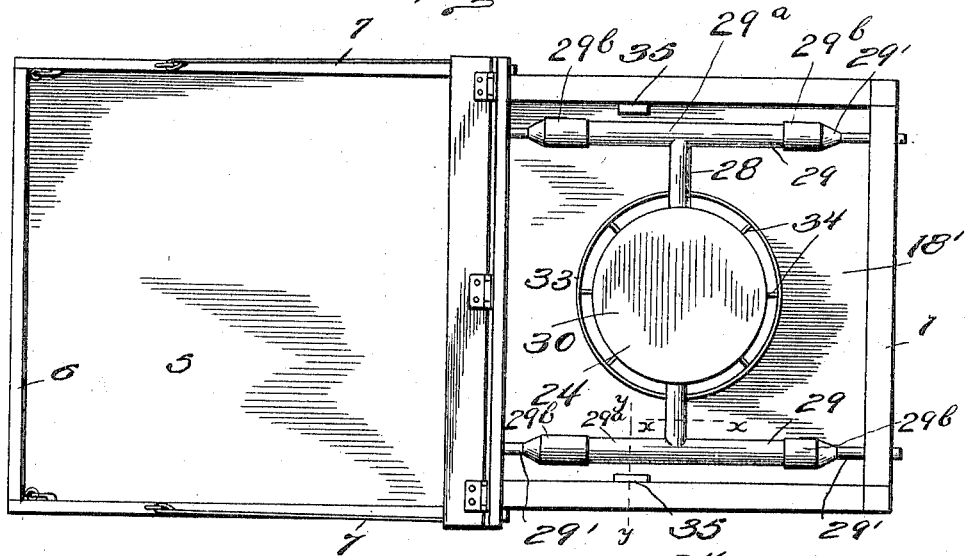
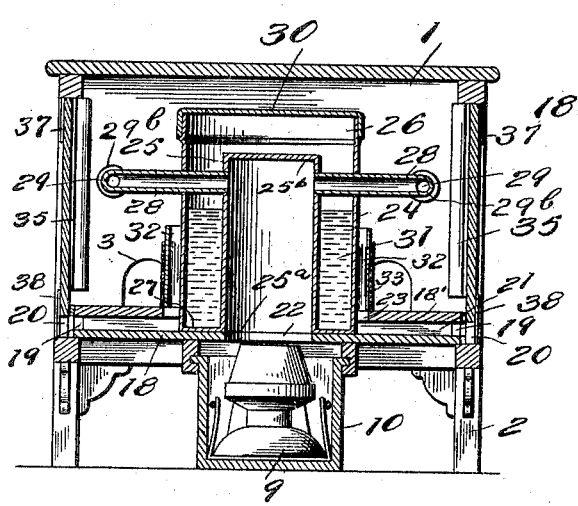
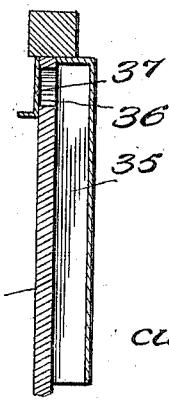
Witnesses
G. R. Thomas
F. J. Veihmeyer
Inventor
Clarence A. Tuck
By Edson Bro's
Attorneys

UNITED STATES PATENT OFFICE.

CLARENCE A. TUCK, OF WATERTOWN, SOUTH DAKOTA.

BROODER.

No. 817,021.     Specification of Letters Patent.     Patented April 3, 1906.

Application filed June 26, 1905. Serial No. 267,056.

*To all whom it may concern:*

Be it known that I, CLARENCE A. TUCK, a citizen of the United States, residing at Watertown, in the county of Codington and State of South Dakota, have invented certain new and useful Improvements in Brooders; and I do hereby declare the following to be a full, clear, and exact description of the invention, such as will enable others skilled in the art to which it appertains to make and use the same.

My invention relates to improvements in brooders for raising poultry.

It has for its object to improve the heating and ventilating facilities of brooders.

The invention consists in the features of construction and combinations of parts hereinafter described, and more particularly pointed out in the claims concluding this specification.

In the accompanying drawings, illustrating the preferred embodiment of my invention, Figure 1 is a side elevation of a brooder constructed in accordance with my invention, the runway being shown in solid lines in its raised position and in dotted lines in its lowered position. Fig. 2 is a front elevation of the brooder with the runway down and the gate open. Fig. 3 is a plan view of the device as shown in Fig. 1, but with the cover raised. Fig. 4 is a central vertical sectional view taken in line with the air-inlet passages. Fig. 5 is a vertical sectional view on the line $x\ x$ of Fig. 3, taken transversely of one of said inlet-passages. Fig. 6 is a broken detail section on the line $y\ y$ of Fig. 3, taken vertically through one of the air-outlet passages.

While the preferred embodiment of my invention is illustrated in the accompanying drawings and its construction and operation are described in this specification, the right is reserved to make such changes in the construction shown and described herein as the scope of the claims hereto appended will permit.

In carrying out my invention I construct the casing 1 preferably raised upon legs 2 and provided with doorways 3, in the front thereof with closures 4. In said front is also preferably provided a glass-covered opening or window $4^a$ to admit light. A tray or runway 5, having a hinged let-down gate 6 at its outer end, is adjustably secured to the front of the casing by means of the hooked rods 7 and eyes 8. The inner edge of the runway rests upon a ledge or projection $8^a$ (shown in Fig. 2) from the front of the casing and is arranged on a level with the doors. There are two sets of eyes 8, one arranged above the other, and either of which may be engaged by the hooked rods 7. When said rods engage the upper set or pair of eyes, the runway is supported in a horizontal position, as shown in solid lines in Fig. 1, while if said rods are connected to the lower pair of eyes said runway will be inclined from the casing to the ground, as shown in dotted lines in Fig. 1. When in the latter position, the gate 6 may be let down, as shown in Fig. 2, and the chicks are permitted to run in and out.

The lamp 9 for heating the interior of the brooder is adjustably mounted in a slide or drawer 10, adapted to slide in under the bottom of the brooder.

The bottom of the brooder is made double, so that the inner floor will always be warm. The lower bottom plate 18 has a flange 19, extending all around it, except at the air-inlet openings 20, which are arranged in the casing on a level with said plate. From said air-inlet openings grooves formed of strips 21 on the bottom plate lead to near the center opening 22 in said plate, which, of course, is arranged over the lamp. The upper bottom or floor of the brooder rests upon the flange 19 and strips 21 on the lower bottom plate, thus completing the air-inlet passages from the openings in the casing to the center opening 23 in the upper floor-plate, which opening is somewhat larger than that in the lower bottom plate.

The annular reservoir 24 fits within the opening 23 upon the bottom plate. Said reservoir is constructed of concentric cylinders, the inner one 25 being about the same diameter as the opening in the bottom plate, over which its lower open end $25^a$ fits, and having a closed upper end $25^b$ arranged below the level of the upper edge of the outer cylinder 26. Said cylinders are connected at their lower ends by the circular bottom 27 and near their upper ends by pipes 28, opening on the interior of the inner cylinder and extending through the outer cylinder. The pipes 28 carry branch pipes 29, preferably composed of central sections $29^a$, connected to said pipes 28, and end sections $29^b$, telescoping over the sections $29^a$ and having their outer ends extending through the casing. Said outer ends are reduced in cross-section, as at $29'$, to retain the greater part of the heat within the pipes in the brooder. The top 30 of the outer cylinder is removable, so that the space between the cylinders and above the inner cylinder may be filled with hot water 31, which aids in radiating the heat generated by the lamp through the branch pipes extending to the corners of the casing. To the outer surface of the outer cylinder are secured tubes or passages 32, which register with and form continuations of the air-inlet passages between the bottom plate and upper floor plate. By this arrangement the air entering the brooder is warmed before it comes in contact with the chicks, and thus prevents them from being exposed to cold drafts. The chicks are prevented from coming in contact with the reservoir by a partition of wire-gauze 33, supported by brackets 34. The bad air is drawn from the floor through the passages 35 and discharged through openings 36 near the top of the casing. Said openings are preferably provided with closures 37, pivoted to the walls of the brooder, as at 37$^a$, which may be adjusted to only partly close said openings. The air-inlet openings are likewise provided with adjustable closures 38, pivoted at 38$^a$.

Having thus described my invention, what I claim as new, and desire to secure by Letters Patent, is—

1. A brooder comprising a casing having an elevated floor, a runway having one edge arranged on a level with said floor, and means, adapted to engage the body of said casing, for adjusting said runway level or inclined from the floor of the casing to the ground.

2. A brooder comprising a casing having an elevated floor, and provided with eyes secured thereto, and a runway carrying hooks adapted to engage said eyes whereby the runway may be supported on a level with the floor of said casing.

3. A brooder comprising a casing having an elevated floor and provided with two sets of eyes secured thereto, and a runway having one edge arranged on a level with said floor, said runway carrying hooks adapted to engage either of said sets of eyes to support the runway level with the floor of the casing or inclined from said floor to the ground.

4. A brooder comprising a casing provided in its floor with an opening designed to be placed over a heater, a reservoir arranged over said opening, said reservoir having concentric walls, the inner wall closed at the top, pipes extending through the outer wall of the reservoir and opening on the interior of the inner wall, branch pipes connected to the first-mentioned pipes, and sections of pipe fitted over the ends of said branch pipes and having their extremities restricted in diameter and passing through the sides of the casing near the corners thereof.

5. A brooder comprising a casing provided in its floor with an opening designed to be placed over a heater, a reservoir arranged over said opening, said reservoir having concentric walls, the inner wall closed at the top, pipes extending through the outer wall of the reservoir opening on the interior of the inner wall, branch pipes connected to the first-mentioned pipes, and sections of pipe fitted to telescope over the ends of said branch pipes and having their extremities restricted in diameter and passing through the sides of the casing near the corners thereof.

6. A brooder comprising a casing, having a double floor with passages therebetween and an opening designed to be placed over a heater, a heating-drum extending through the opening in the upper floor and resting on the lower floor over said opening, air-inlet tubes arranged at the sides of said drum and forming continuations of the passages between the floors.

7. A brooder comprising a casing having a double floor with passages therebetween and an opening designed to be placed over a heater, a heating-drum extending through the opening in the upper floor and resting on the lower floor over said opening, air-inlet tubes arranged at the sides of said drum and forming continuations of the passages between the floors, and air-exit tubes extending from near the floor and provided with outlets near the top of said casing.

In testimony whereof I affix my signature in the presence of two witnesses.

CLARENCE A. TUCK.

Witnesses:
WM. H. HART,
T. BENSON.